(12) United States Patent
Sakamaki et al.

(10) Patent No.: US 9,016,988 B2
(45) Date of Patent: Apr. 28, 2015

(54) TOOL HOLDER

(75) Inventors: Kazuo Sakamaki, Ojiya (JP); Akira Sakamaki, Ojiya (JP); Isao Sakamaki, legal representative, Nagano (JP); Koichi Takizawa, Ojiya (JP); Tomokazu Seki, Ojiya (JP)

(73) Assignee: Yukiwa Seiko Kabushiki Kaisha, Niigata (JP)

( * ) Notice: Subject to any disclaimer, the term of this patent is extended or adjusted under 35 U.S.C. 154(b) by 447 days.

(21) Appl. No.: 13/503,777

(22) PCT Filed: Oct. 19, 2010

(86) PCT No.: PCT/JP2010/068316
§ 371 (c)(1),
(2), (4) Date: Apr. 24, 2012

(87) PCT Pub. No.: WO2011/052421
PCT Pub. Date: May 5, 2011

(65) Prior Publication Data
US 2012/0207560 A1  Aug. 16, 2012

(30) Foreign Application Priority Data

Oct. 30, 2009  (JP) ................................ 2009-250358
Dec. 28, 2009  (JP) ................................ 2009-298334

(51) Int. Cl.
*B23C 5/00*   (2006.01)
*B23Q 3/12*   (2006.01)
(Continued)

(52) U.S. Cl.
CPC . *B23Q 3/12* (2013.01); *B23C 5/003* (2013.01); *B23B 31/00* (2013.01); *B23B 2250/16* (2013.01); *B23C 2250/16* (2013.01); *B23Q 11/0032* (2013.01)

(58) Field of Classification Search
CPC .... B23C 5/003; B23B 29/022; B23B 27/002; B23B 2250/16; B23Q 11/0035
USPC .................................. 408/143, 141; 409/141
See application file for complete search history.

(56) References Cited

U.S. PATENT DOCUMENTS 4,068,742 A * 1/1978 Resare ........................ 188/322.5
5,074,723 A * 12/1991 Massa et al. .................. 409/131
(Continued)

FOREIGN PATENT DOCUMENTS

JP     61076251 A * 4/1986
JP     03221303 A * 9/1991
(Continued)

OTHER PUBLICATIONS

International Search Report for PCT/JP2010/068316 dated Nov. 22, 2010.
(Continued)

*Primary Examiner* — Daniel Howell
*Assistant Examiner* — Nicole N Ramos
(74) *Attorney, Agent, or Firm* — Sughrue Mion, PLLC

(57) ABSTRACT

To provide a tool holder that is capable of exerting a vibration-minimizing effect in a reliable manner using a simple configuration and that is extremely useful for practical application. A tool holder comprising a vibration-minimizing part for minimizing vibration generated in a tool (1) when the tool (1) is used to perform machining, the vibration-minimizing part being provided, on a distal-end side, with tool-holding means for detachably securing the tool (1) and provided, on a proximal-end side, with a shank part (2) to be mounted on a spindle of a machine tool; wherein a plurality of reinforcing parts (4) extending in an axial direction of the tool holder (3) are provided to a peripheral section of the tool holder (3) in a radial direction; accommodating recesses (6) for accommodating a vibration-damping material (5) are provided between the reinforcing parts (4); the vibration-damping material (5) is accommodated in the accommodating recesses (6); and the vibration-damping material (5) and the reinforcing parts (4) form the vibration-minimizing part.

15 Claims, 15 Drawing Sheets

(51) Int. Cl.
*B23B 31/00* (2006.01)
*B23Q 11/00* (2006.01)

(56) References Cited

U.S. PATENT DOCUMENTS

| | | | |
|---|---|---|---|
| 6,280,126 B1 * | 8/2001 | Slocum et al. | 409/141 |
| 6,929,431 B2 * | 8/2005 | Bergholt et al. | 408/143 |
| 2009/0003947 A1 * | 1/2009 | Haimer et al. | 408/143 |

FOREIGN PATENT DOCUMENTS

| | | | |
|---|---|---|---|
| JP | 5-53839 U | | 7/1993 |
| JP | 06155131 A | * | 6/1994 |
| JP | 07227711 A | * | 8/1995 |
| JP | 7-285002 A | | 10/1995 |
| JP | 9-248727 A | | 9/1997 |
| JP | 9-253965 A | | 9/1997 |
| JP | 11010414 A | * | 1/1999 |
| JP | 2004-1104 A | | 1/2004 |
| JP | 2005-232729 A | | 9/2005 |
| JP | 2008-100332 A | | 5/2008 |
| WO | WO 2008002145 A1 | * | 1/2008 |

OTHER PUBLICATIONS

International Preliminary Report on Patentability dated Jun. 21, 2012 issued in corresponding PCT/JP2010/068316.

* cited by examiner

TOOL HOLDER

TECHNICAL FIELD

The present invention relates to a tool holder.

BACKGROUND ART

An example of a tool holder, in which tool-holding means for detachably securing a tool is provided on a distal-end side and a shank part to be mounted on a spindle of a machine tool is provided on a proximal-end side, is one that is disclosed in Patent Citation 1.

In recent years, materials known as difficult-to-machine materials are entering use in a variety of fields. In an instance in which a machine tool of above description is used to machine a difficult-to-machine material, depending on machining conditions, the vibration of a tool during machining may increase, resulting in a deterioration in the surface roughness of a machined surface or damage to the tool itself.

There have been proposed techniques in which an anti-vibration member is internally provided within a tool holder and vibration is minimized, as disclosed, e.g., in Patent Citations 2 and 3.

PRIOR ART CITATIONS

Patent Citations

[Patent Citation 1] JP-A 2004-1104
[Patent Citation 2] JP-A 7-285002
[Patent Citation 3] JP-A 2008-100332

DISCLOSURE OF THE INVENTION

Problems to be Solved by the Invention

However, the techniques disclosed in Patent Citations 2 and 3 mentioned above actually are not so effective in minimizing vibration, and cannot be relied on for practical use.

With the foregoing circumstances in view, the present invention was devised as a result of extensive research, in which it was discovered that accommodating a vibration-damping material in an accommodating recess part between reinforcing parts on the peripheral section of a tool holder increases the stiffness of the tool holder and the vibration-damping material accommodated in a state of being plurally segmented in the peripheral direction makes it possible to damp vibration in an efficient manner and minimize vibration of the tool in a reliable manner. The present invention provides a tool holder that is capable of exerting a vibration-minimizing effect in a reliable manner using a simple configuration and that is extremely useful for practical application.

BEST MODE FOR CARRYING OUT THE INVENTION

An overview of the present invention will now be described with reference to the accompanying drawings.

A first aspect of the present invention relates to a tool holder comprising a vibration-minimizing part for minimizing vibration generated in a tool 1 when the tool 1 is used to perform machining, the vibration-minimizing part being provided, on a distal-end side, with tool-holding means for detachably securing the tool 1 and provided, on a proximal-end side, with a shank part 2 to be mounted on a spindle of a machine tool; the tool holder being characterized in that a plurality of reinforcing parts 4 extending in an axial direction of the tool holder 3 are provided in a radial direction to a peripheral section of the tool holder 3; accommodating recesses 6 for accommodating a vibration-damping material 5 are provided between the reinforcing parts 4; the vibration-damping material 5 is accommodated in the accommodating recesses 6; and the vibration-damping material 5 and the reinforcing parts 4 constitute the vibration-minimizing part.

A second aspect of the present invention relates to a tool holder comprising a vibration-minimizing part for minimizing vibration generated in a tool 1 when the tool 1 is used to perform machining, the vibration-minimizing part being provided, on a distal-end side, with tool-holding means for detachably securing the tool 1 and provided, on a proximal-end side, with a shank part 2 to be mounted on a spindle of a machine tool; the tool holder being characterized in that a plurality of reinforcing ribs extending in an axial direction of the tool holder 3 are provided in a radial direction to a peripheral section of the tool holder 3; a space between each of the reinforcing ribs is configured as an accommodating recess 6 for accommodating a vibration-damping material 5; the vibration-damping material 5 is accommodated in the accommodating recesses 6; and the vibration-damping material 5 and the reinforcing ribs constitute the vibration-minimizing part.

A third aspect of the present invention relates to a tool holder comprising a vibration-minimizing part for minimizing vibration generated in a tool 1 when the tool 1 is used to perform machining, the vibration-minimizing part being provided, on a distal-end side, with tool-holding means for detachably securing the tool 1 and provided, on a proximal-end side, with a shank part 2 to be mounted on a spindle of a machine tool; the tool holder being characterized in that a plurality of reinforcing walls extending in an axial direction of the tool holder 3 are provided in a radial direction to a peripheral section of the tool holder 3; hole-shaped accommodating recesses 6 for accommodating a vibration-damping material 5 are provided between the reinforcing walls; the vibration-damping material 5 is accommodated in the hole-shaped accommodating recesses 6; and the vibration-damping material 5 and the reinforcing walls constitute the vibration-minimizing part.

A fourth aspect of the present invention relates to a tool holder according to the first aspect, characterized in that the accommodating recesses 6 are provided to equidistant positions along a peripheral direction of the tool holder 3.

A fifth aspect of the present invention relates to a tool holder according to the second aspect, characterized in that the accommodating recesses 6 are provided to equidistant positions along a peripheral direction of the tool holder 3.

A sixth aspect of the present invention relates to a tool holder according to the third aspect, characterized in that the accommodating recesses 6 are provided to equidistant positions along a peripheral direction of the tool holder 3.

A seventh aspect of the present invention relates to a tool holder according to the first aspect, characterized in that the accommodating recesses 6 are provided to positions that are symmetrical about an axial center of the tool holder 3.

An eighth aspect of the present invention relates to a tool holder according to the second aspect, characterized in that the accommodating recesses 6 are provided to positions that are symmetrical about an axial center of the tool holder 3.

A ninth aspect of the present invention relates to a tool holder according to the third aspect, characterized in that the accommodating recesses 6 are provided to positions that are symmetrical about an axial center of the tool holder 3.

A tenth aspect of the present invention relates to a tool holder according to any of the first through third aspects, characterized in that a locking annular body 7 for preventing the vibration-damping material 5 from dislodging is fitted on the tool holder 3.

An eleventh aspect of the present invention relates to a tool holder according to the tenth aspect, characterized in that the locking annular body 7 is provided in a state of being incapable of rotating relative to the tool holder 3.

A twelfth aspect of the present invention relates to a tool holder according to the tenth aspect, characterized in that the locking annular body 7 is provided in a state of being capable of oscillatory movement relative to the tool holder 3.

A thirteenth aspect of the present invention relates to a tool holder according to any of the first through third aspects, characterized in that an article made from a viscoelastic body is used as the vibration-damping material 5.

A fifteenth aspect of the present invention relates to a tool holder according to any of the first through third aspects, characterized in that an article made from a large quantity of particulate is used as the vibration-damping material 5.

A seventeenth aspect of the present invention relates to a tool holder according to any of the first through third aspects, characterized in that an article made from a viscoelastic body is used as the vibration-damping material 5, and a spherical body is embedded in the viscoelastic body.

Effect of the Invention

Since the present invention is configured as described above, there is obtained a tool holder that is capable of exerting a vibration-minimizing effect in a reliable manner using a simple configuration and that is extremely useful for practical application.

BEST MODE FOR CARRYING OUT THE INVENTION

Figure 1:
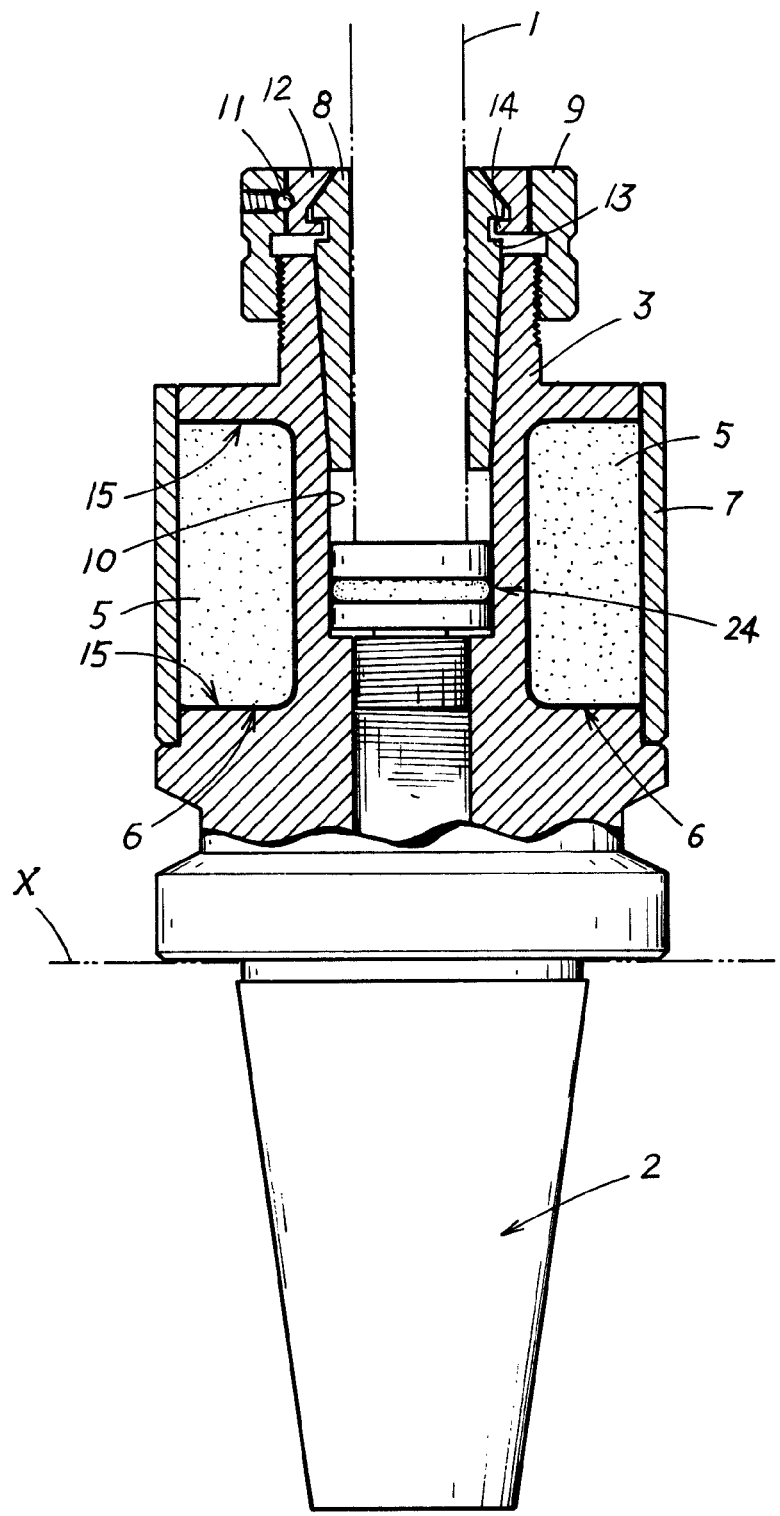
FIG. 1 is a partly cut-out schematic side view showing a configuration of a present embodiment.

Preferred embodiments of the present invention will be briefly described with reference to the accompanying drawings while indicating the effects of the present invention.

When a shank part 2 of a tool holder 3 is fitted on a spindle of a machine tool, a tool 1 that is held is caused to rotate, and machining is performed, a vibration generated in the tool 1 is transmitted through the tool holder 3 to a vibration-minimizing part. Vibration energy is converted into heat energy, and damped, by friction between vibration-damping materials 5 and reinforcing parts 4, in addition to friction between molecules in the vibration-damping materials 5 (in an instance of a viscoelastic body) or friction between vibration-damping materials 5 (in an instance of a granular body). Vibration of the tool 1 is thereby minimized.

Specifically, friction is mutually generated between the vibration-damping materials 5, which are provided in a state of being segmented in the peripheral direction, and a side surface of each of the reinforcing parts 4 between the vibration-damping materials 5 (i.e., a wall surface that is perpendicular to the direction of rotation of the tool 1), whereby conversion of vibration energy into heat energy is further promoted; and the reinforcing parts 4, which exert a function of increasing stiffness (minimizing vibration), are also made to contribute towards conversion of vibration energy into heat energy. Together with the increase in stiffness due to the reinforcing parts 4, it becomes possible to minimize the vibration of the tool 1 in an extremely efficient manner.

Embodiments

A specific embodiment of the present invention will now be described with reference to the accompanying drawings.

The present embodiment is a tool holder comprising a vibration-minimizing part for minimizing vibration generated in a tool 1 when the tool 1 is used to perform machining, the vibration-minimizing part being provided, on a distal-end side, with tool-holding means for detachably securing the tool 1 and provided, on a proximal-end side, with a shank part 2 to be mounted on a spindle of a machine tool. A plurality of reinforcing parts 4 extending in an axial direction of the tool holder 3 are provided in a radial direction to a peripheral section of the tool holder 3; accommodating recesses 6 for accommodating a vibration-damping material 5 are provided between the reinforcing parts 4; the vibration-damping material 5 is accommodated in the accommodating recesses 6; and the vibration-damping material 5 and the reinforcing parts 4 constitute the vibration-minimizing part.

Specifically, in the present embodiment, the present invention is applied to a chuck device in which a clamping body 8 installed in the tool holder 3 and adapted to be capable of being reduced in diameter using slits is expanded or narrowed by rotation of a tightening body 9 threaded onto the tool holder 3 and the tool 1 is clamped, as shown in FIG. 1. The present invention can also be similarly applied to a shrink-fit-type chuck device in which a tool is secured and held by shrink fitting.

The tool holder 3 also has a penetrating inner hole 10. An external thread, which screws onto an internal thread on an inner surface of the tightening body 9, is provided to an outer peripheral surface at a distal end. A ring member 12 is rotatably provided to an inner-surface distal end of the tightening body 9 with a ball 11 interposed therebetween. An insertion convex part 14, which is inserted into a concave groove 13 of the clamping body 8, is provided to an inner-surface proximal end of the ring member 12. In the drawings, numeral 39 indicates a protrusion amount setting part screwed near a center of the penetrating inner hole 10, coming into contact with a proximal-end part of the tool 1, and setting the amount of protrusion of the tool 1.

In the present embodiment, the shank part 2 has a tapered shape and is configured to be directly mounted to the spindle. However, the shank part 2 may have a straight shape and is configured to be mounted to the spindle interposed by a separate holder.

A plurality of reinforcing ribs (reinforcing parts 4) extending in the axial direction of the tool holder 3 are provided in a row, at a plurality of predetermined intervals (regular intervals) along the peripheral direction of the tool holder 3, on an outer peripheral section of the tool holder 3 rearward of a distal end part to which the tightening body 9 is provided, forward of the shank part 2 to be mounted on the machining tool X, and rearward of the tool-holding means. The reinforcing ribs are projectingly provided in a radial direction (radially) from an axial center of the tool holder 3, and a bottom surface of a space between the reinforcing ribs is configured so as to be an arc bottom surface. The bottom surface of the space between the reinforcing ribs may also have a flat bottom surface or another configuration. The reinforcing ribs may also be configured so as to be provided in a row at irregular intervals.

The reinforcement provided by the reinforcing part 4 (reinforcing ribs and reinforcing walls described further below) of the present embodiment refers to imparting a center peripheral section of the tool holder 3 to which the vibration-minimizing part is provided with the same diameter as the smallest-diameter part of the tool holder 3 obtained connecting the bottom surface of the accommodating recess 6, and reinforcing the stiffness of the tool holder 3 to a greater extent than in an instance in which no vibration-minimizing part is provided.

Both end parts of the reinforcing ribs in the axial direction of the tool holder 3 are linked by a flange portion 15 extending in the peripheral direction. A space enclosed by an inner surface of the flange portion 15 and side surfaces of the reinforcing ribs is configured as the accommodating recess 6 for accommodating the vibration-damping material 5. The vibration-damping material 5 is accommodated (charged) in the accommodating recess 6 in a state of being press-fitted and in intimate contact.

For the vibration-damping material 5, in the present embodiment, a rubber (viscoelastic body) having a high damping capacity is used. Since the natural frequency of rubber varies at different hardnesses, a rubber having a desired hardness is used in accordance with a variety of usage conditions. A resin or another viscoelastic body other than rubber may also be used. A configuration is also possible in which the accommodating recess 6 accommodates a large quantity of burned sand, steel balls (e.g., made of carbide), lead, mica, or other particulates having a diameter of approximately 50 μm to 2 mm, instead of a viscoelastic body. In an instance in which a large quantity of particulate is accommodated, they are charged so that some spacing is available in order to allow them to rub against each other. In the instance of steel balls, a configuration is also possible in which a viscous oil is accommodated together in the accommodating recess 6. In all instances, friction between the vibration-damping materials 5 and the reinforcing ribs, in addition to friction between molecules in the vibration-damping material 5 (in an instance of a viscoelastic body) and friction between the vibration-damping materials 5 (in an instance of a particulate body), converts vibration energy into heat energy, whereby the vibration energy is damped and the vibration of the tool 1 is minimized in a satisfactory manner.

Figure 2:
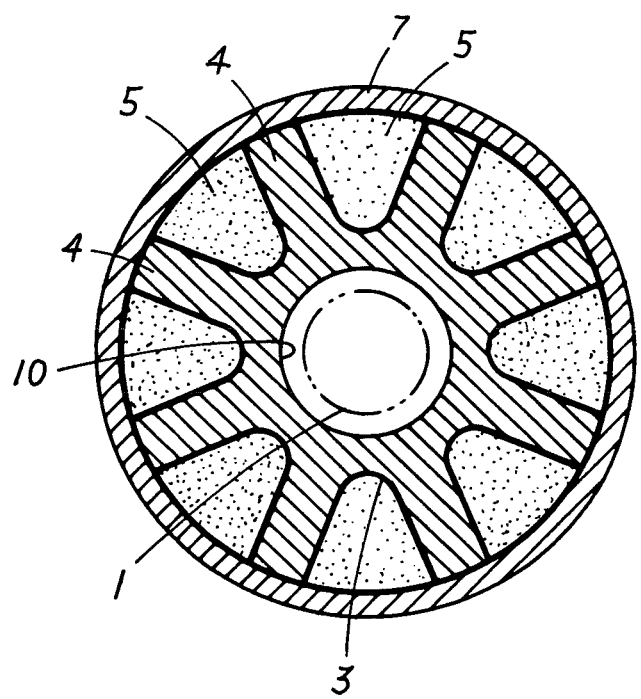
FIG. 2 is a schematic lateral cross-section view illustrating the present embodiment.

In the present embodiment, as shown in FIG. 2, the reinforcing ribs and the accommodating recesses 6 are provided at equidistant positions along the peripheral direction of the tool holder 3, whereby vibration-minimizing parts configured by the reinforcing ribs and the vibration-damping materials 5 are provided at equidistant positions along the peripheral direction of the tool holder 3 along the full extent of the peripheral section of the tool holder 3. Therefore, it is possible to damp the vibration in an even more satisfactory manner and minimize the vibration of the tool in a reliable manner. A configuration is also possible in which the reinforcing parts 4, the accommodating recesses 6, and the vibration-minimizing part are provided at positions that are symmetrical about the axial center of the tool holder 3. Specifically, it is preferable that the reinforcing parts 4, the accommodating recesses 6, and the vibration-minimizing part are arranged around the peripheral direction of the tool holder 3 without any unevenness, and any eccentricity and the like in the tool 1 is minimized as much as possible when the tool 1 is caused to rotate and machining is performed.

Although the present embodiment is configured so that the vibration-minimizing part is provided to the outer peripheral section of the tool holder 3 forward of the shank part 2 and rearward of the tool-holding means, a configuration is also possible in which the vibration-minimizing part is provided to the shank part 2.

Also, in the present embodiment, a plurality of vibration-damping materials 5 are provided in a segmented (dispersed) state. Therefore, e.g., the vibration-damping materials 5 accommodated in a single or a plurality of accommodating recesses 6 do not have to be the same material; it is possible to use a material having a different natural frequency from that of the vibration-damping material 5 accommodated in another accommodating recess 6. Accommodating vibration-damping materials 5 (for example, rubbers of different stiffness) whose respective natural frequencies vary in each of the accommodating recesses 6 makes it possible to damp vibration over a wider band and to minimize vibration of the tool in an even more reliable manner.

A locking annular body 7 for preventing the vibration-damping material 5 from dislodging is fitted on the tool holder 3.

The locking annular body 7 is configured so that the locking annular body 7, which has been configured to have substantially the same inner diameter as the diameter of the outer peripheral section (top surface of the flange portion 15 and top surface of the reinforcing ribs 4) of the tool holder 3 as shown in FIGS. 1 and 2, is press-fitted. The press-fitting is not provided by way of limitation, and a configuration is also possible in which [the locking annular body 7] is adheringly secured using an adhesive. Therefore, the locking annular body 7 is provided in a state of not being capable of rotating relative to the tool holder 3.

Figure 3:
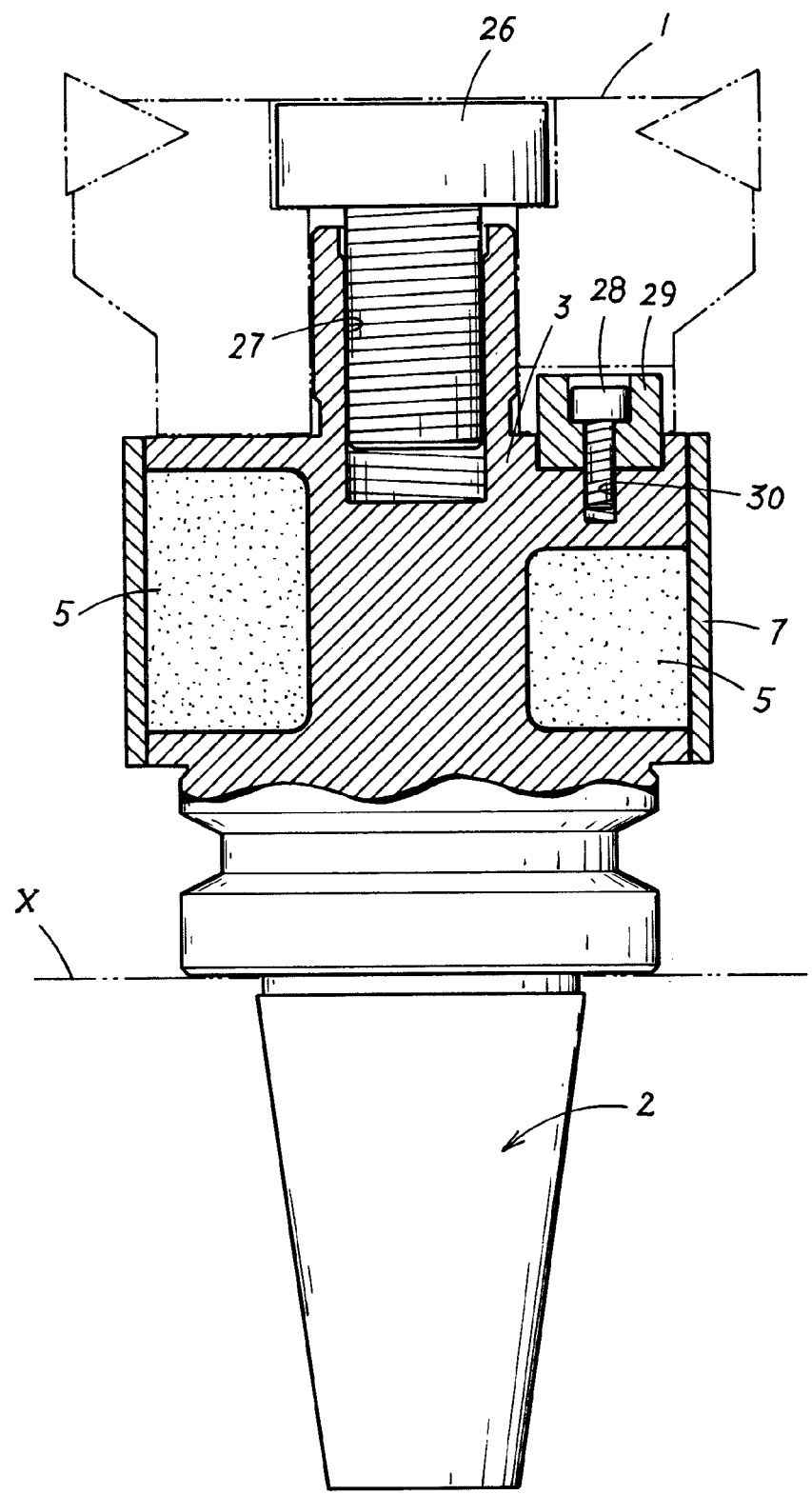
FIG. 3 is a partly cut-out schematic side view showing a configuration of alternative example 1 of the present embodiment.
Figure 4:
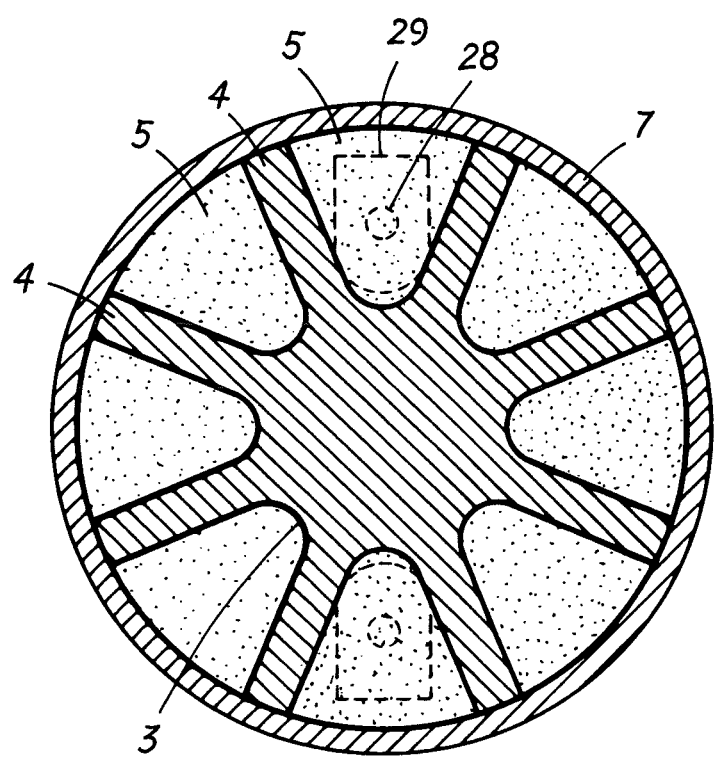
FIG. 4 is a schematic lateral cross-section view illustrating alternative example 1 of the present embodiment.

In the present embodiment, the present invention is applied to a chuck device in which the tool 1 is presumed to be an end mill or a metal saw as described further above. However, similar circumstances apply in an instance in which the present invention is applied to an arbor or a similar device in which a full back cutter (face mill cutter) is mounted as the tool 1 on a distal end, as with, e.g., alternative example 1 shown in FIGS. 3 and 4. In the drawing, numeral 26 represents a mounting screw for mounting the full back cutter; 27 represents a mounting screw hole into which the mounting screw 26 is screwed; 28 represents a stopping screw for blocking, with a rotation-blocking member 29, the rotation of the full back cutter with respect to the arbor; and 30 represents a stopping screw hole into which the stopping screw 28 is screwed.

Figure 5:
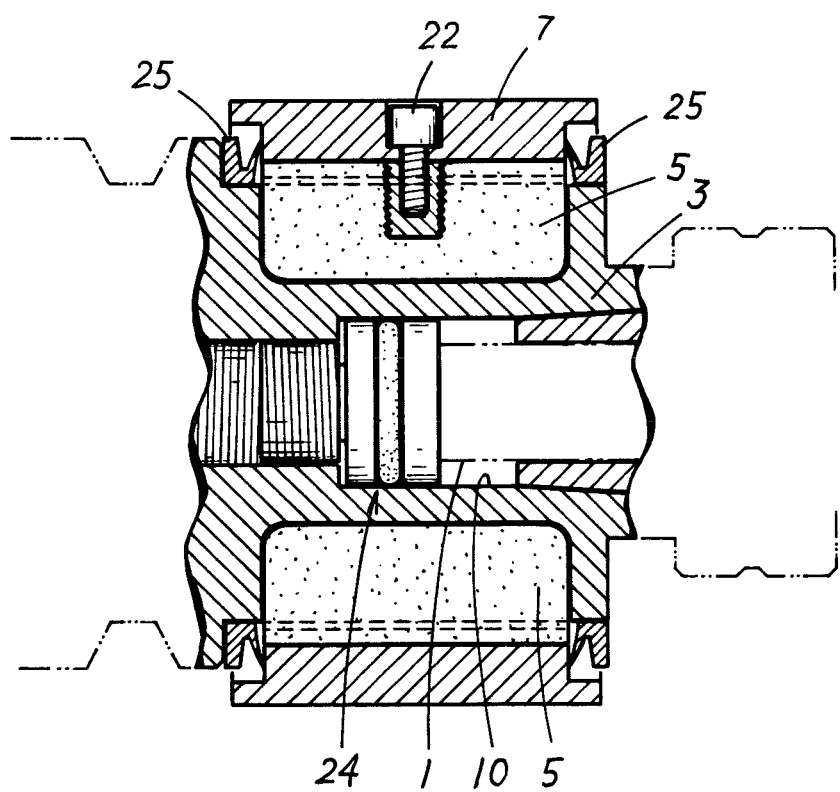
FIG. 5 is a schematic vertical cross-section view illustrating a key section of alternative example 2 of the present embodiment.
Figure 6:
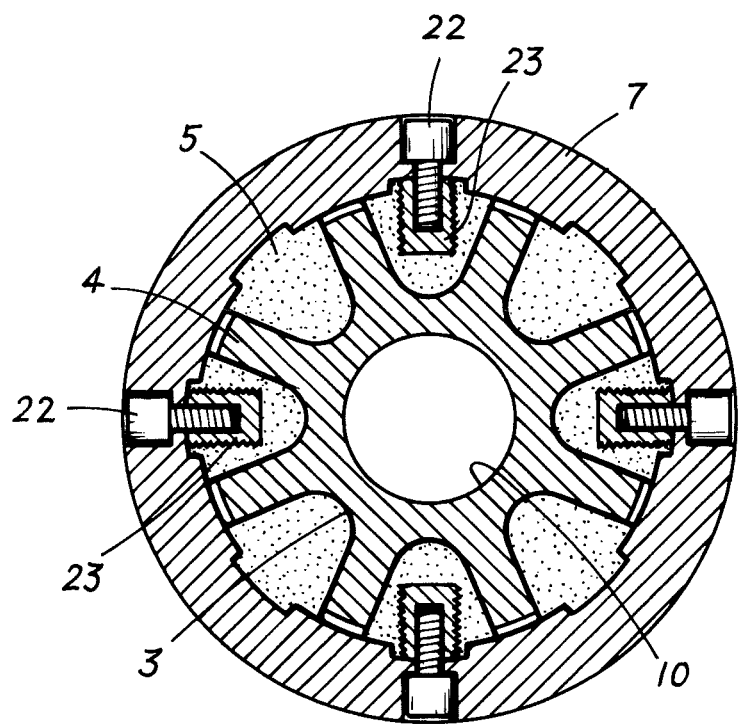
FIG. 6 is a schematic lateral cross-section view illustrating alternative example 2 of the present embodiment.

A configuration is also possible in which the locking annular body 7 is directly secured to the vibration-damping material 5 using securing screws 22 as with alternative example 2 shown in FIGS. 5 and 6. In this instance, an inner surface of the locking annular body 7 and a top surface of the vibration-damping material 5 (rubber) are configured as matingly engaging surfaces that matingly engage with each other. The securing screws 22 are not screwed into every vibration-damping material 5. Instead, for securing purposes, the securing screws 22 are screwed into, e.g., every other vibration-damping material 5 as shown in FIG. 6. In the drawing, numeral 23 represents a screw-securing member, which is made from brass and is embedded in the vibration-damping material 5, and which has a threadedly connecting part, a securing screw 22 threadedly connecting to an inner surface of the threadedly connecting part; and 25 represents a rubber seal.

In alternative example 2, the locking annular body 7 is not secured with respect to the tool holder 3. Vibration centered on the matingly engaging surfaces with respect to the tool holder 3 is tolerated (i.e., a state is present in which oscillatory movement is possible). Therefore, when the vibration transmitted to the tool holder 3 is transmitted through the vibration-damping material 5 to the locking annular body 7, a reactive force generated by inertia arising from the mass of the locking annular body 7 offsets and damps the vibration of the tool holder 3 (i.e., the locking annular body 7 acts as a so-called counterweight). Therefore, according to alternative example 2, a vibration-minimizing effect can be obtained in an even more satisfactory manner.

Also, in the above-mentioned embodiment, a description is given for an example in which reinforcing ribs projectingly provided in the radial direction (radially) from the axial center are used as the reinforcing parts 4, and groove-shaped recesses extending in the axial direction of the tool holder 3 are used as the accommodating recesses 6. However, a plurality of hole-shaped recesses 31 provided in a row along the axial direction of the tool holder 3 may also be used as the accommodating recesses 6. In other words, a variety of configurations, such as long grooves, round holes, or rectangular holes, can be used for the accommodating recesses 6. Alternatively, a single hole-shaped recess 31 can be configured as the accommodating recess 6.

Specifically, as with alternative example 3 shown in FIGS. 7 through 13, a configuration is used in which a plurality of hole-shaped recesses 31 provided in a row (in a straight line) along the axial direction of the tool holder 3 are each used as accommodating recesses 6; and a plurality of sets of the hole-shaped recesses 31 provided in a row along the axial direction are arranged in a row at equidistant positions along the peripheral direction of the tool holder 3. Each of the hole-shaped recesses 31 of each of the accommodating recesses 6 is bored on an outer peripheral section of the tool holder 3 using a hole-making tool or a similar tool; and each portion that corresponds to a wall part that remains after the hole-shaped recesses 31 on the outer peripheral section of the tool holder 3 have been bored (i.e., portion protruding outwards with respect to the hole-shaped recesses 31) and that extends (between each of the accommodating recesses 6) in the axial direction (i.e., portion indicated by A in the drawing) represents a reinforcing wall (reinforcing part 4) exerting a function similar to that of the above-mentioned reinforcing rib. Specifically, in an instance in which the hole-shaped recesses 31 are being bored, they are bored so that the reinforcing walls (reinforcing parts 4) extending in the axial direction remain. The spacing between each of the accommodating recesses 6 is set to at least a spacing substantially equal to, e.g., the diameter (maximum diameter) of each of the hole-shaped recesses 31.

In this instance, each of the hole-shaped recesses 31 of each of the accommodating recesses 6 can be formed merely by using a hole-forming tool or a similar tool to bore the hole-shaped recess 31 on the outer peripheral section of the tool holder 3. Machining can be more readily performed by an extent corresponding to a lack of need to move a machining tool in the horizontal direction, compared to an instance in which a groove-shaped recess is formed. Although, in FIGS. 7 through 13, the hole-shaped recesses 31 are bored so that no overlapping takes place, a configuration is also possible in which boring is performed so that partial overlapping takes place and the hole-shaped recesses 31 communicate to each other.

Figure 7:
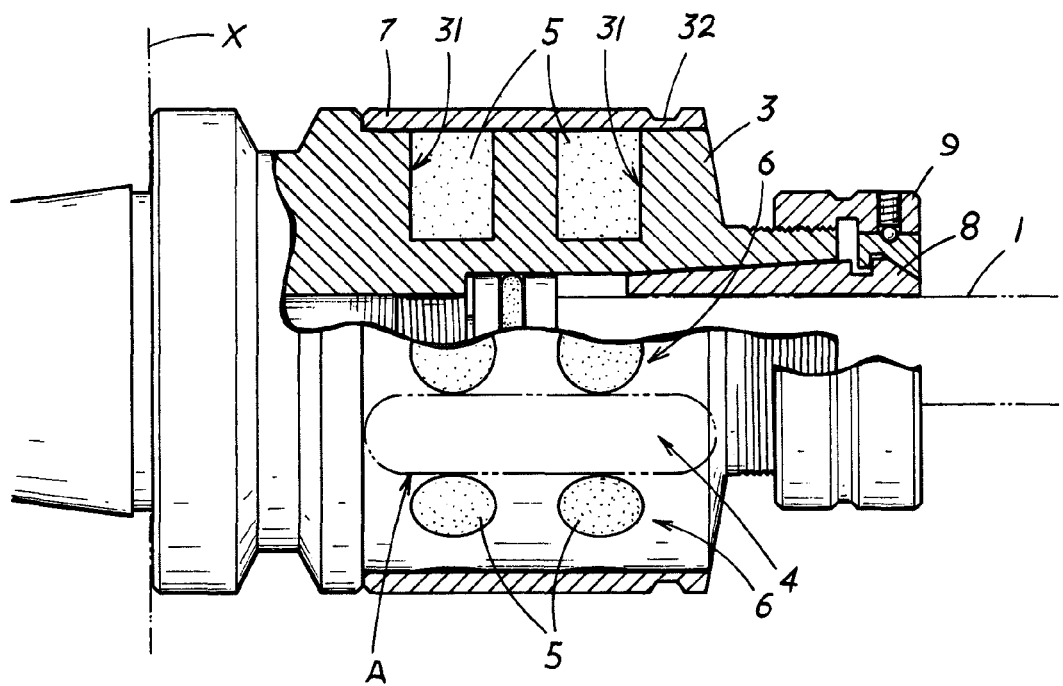
FIG. 7 is a partly cut-out schematic side view showing a configuration of alternative example 3-1 of the present embodiment.
Figure 8:
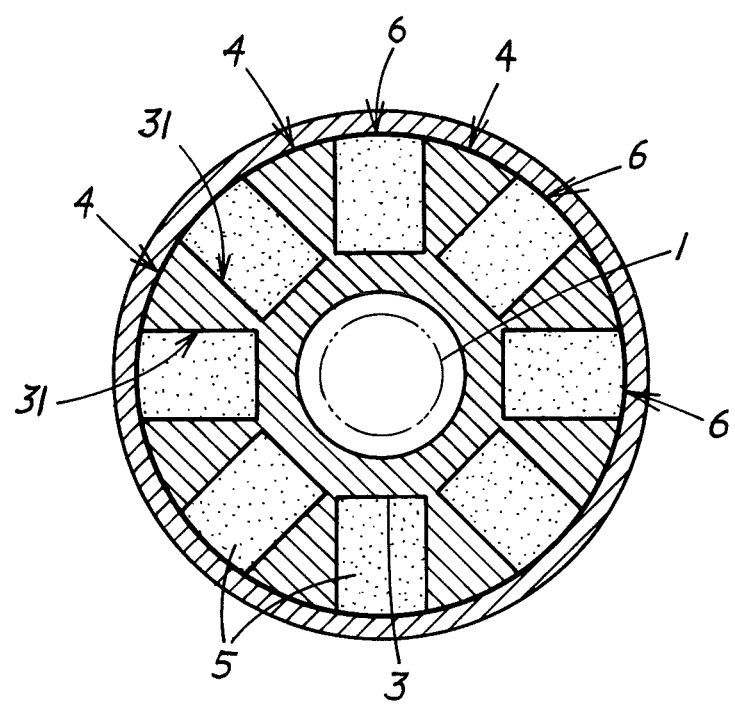
FIG. 8 is a schematic lateral cross-section view illustrating alternative example 3-1 of the present embodiment.

A specific description will now be given with reference to the drawings. In FIGS. 7 and 8 (alternative example 3-1), hole-shaped recesses 31 are bored on a tool holder 3 similar to the above-mentioned embodiment, two hole-shaped recesses 31 are provided in a row along the axial direction and a accommodating recess 6 is formed, and eight of each of the accommodating recesses 6 and reinforcing walls functioning as the reinforcing parts 4 are provided in an alternating manner around the peripheral direction. Each of the hole-shaped recesses 31 is filled with a rubber (may be a particulate) as the vibration-damping material 5, and the locking annular body 7 is press-fitted onto the tool holder 3. An engaging recess 32, to which a pulling-out tool for pulling out the locking annular body 7 is engaged, is provided on a distal-end side of the locking annular body 7.

Figure 9:
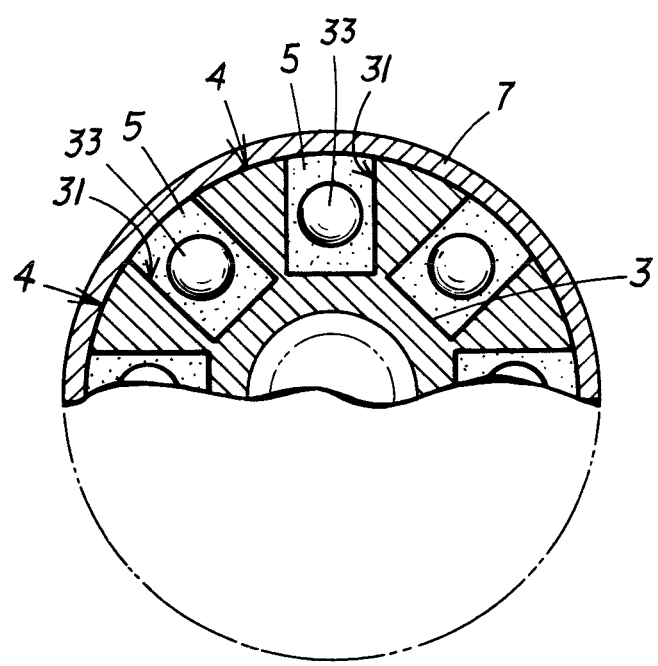
FIG. 9 is a schematic lateral cross-section view illustrating alternative example 3-2 of the present embodiment.

In FIG. 9 (alternative example 3-2), a configuration is present in which the vibration-damping material 5 in FIGS. 7 and 8 comprises not only rubber but also one each of a steel ball 33 (or a carbide ball or another spherical body) embedded in the rubber. In this instance, a reactive force generated by inertia arising from the mass of the steel ball 33 offsets and damps the vibration of the tool holder 3. The number of the spherical bodies provided in the same accommodating recess 6 is not limited to one; a plurality may also be provided, but preferably so as to not be in contact with each other.

Figure 10:
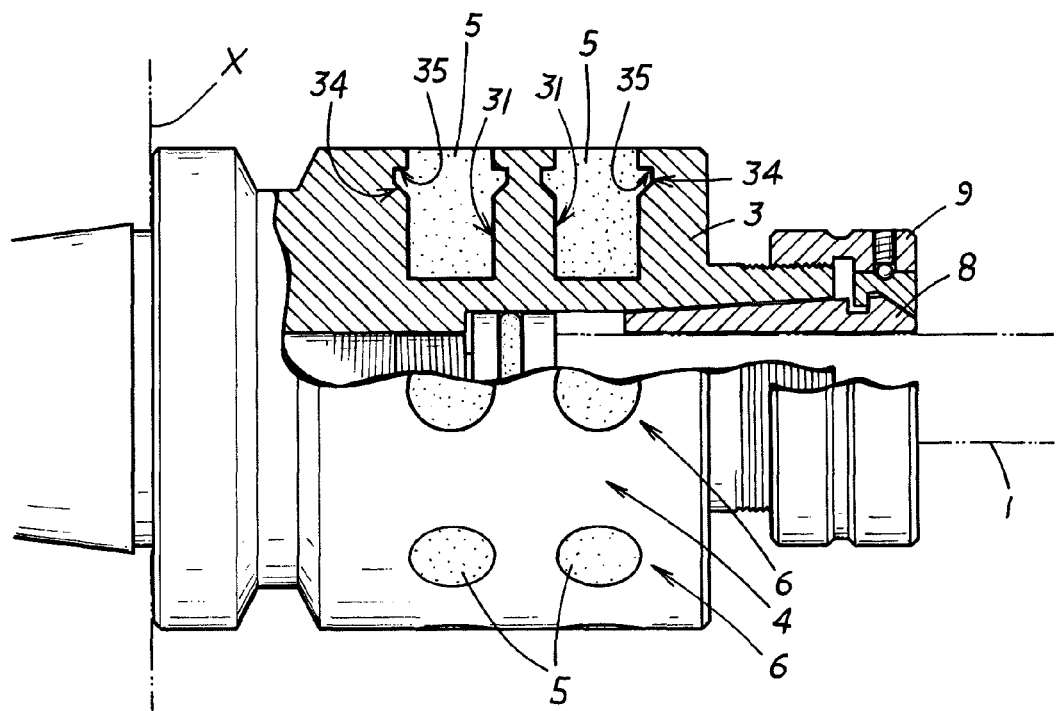
FIG. 10 is a partly cut-out schematic side view showing a configuration of alternative example 3-3 of the present embodiment.
Figure 11:
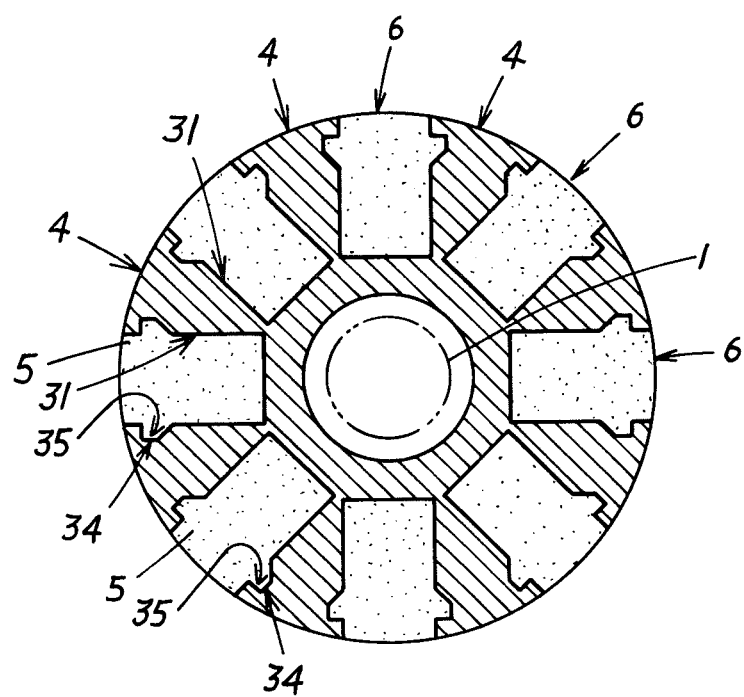
FIG. 11 is a schematic lateral cross-section view illustrating alternative example 3-3 of the present embodiment.

In FIGS. 10 and 11 (alternative example 3-3), a configuration is present in which a locking annular body 7 is not required in FIGS. 7 and 8, and in which an engaging recess engaging recess 35, to which a locking engaging part 34 provided to the rubber functioning as the vibration-damping material 5 is engaged, and the rubber is prevented from slipping off the hole-shaped recesses 31. Specifically, the locking engaging part 34 is provided so as to have a flange shape, and an engaging recess 35 is provided as a looped groove. In such an instance, the need for the locking annular body 7 is obviated, reducing the cost by a corresponding amount. The locking engaging part 34 may also be configured so as to have a plurality of protrusions provided in the peripheral direction of the rubber, and a plurality of the engaging recesses 35 may be provided as engaging holes that engage with the protrusions.

Figure 12:
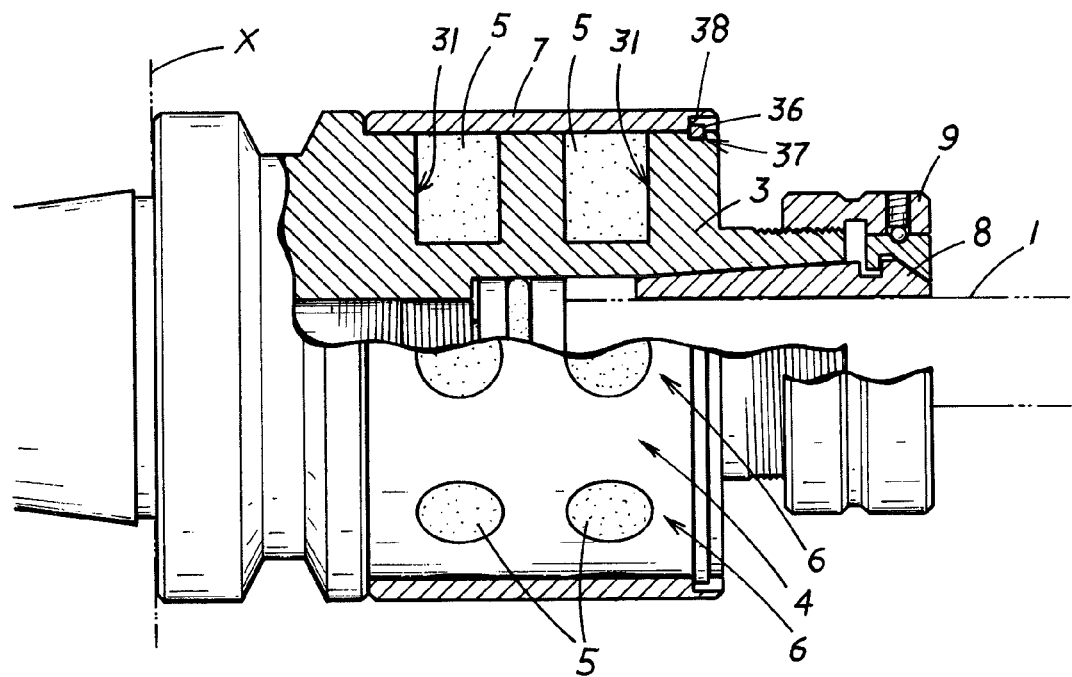
FIG. 12 is a partly cut-out schematic side view showing a configuration of alternative example 3-4 of the present embodiment.

In FIG. 12 (alternative example 3-4), a configuration is present in which the locking annular body 7 in FIGS. 7 and 8 is engaged using a C-shaped locking ring 36 provided to a distal-end side, instead of being press-fitted. A groove 37, to which the locking ring 36 is provided, is provided to the distal-end side at a large-diameter portion (thick-walled portion) at a center of the tool holder 3; and a engaging step part 38, for engaging with the locking ring 36 provided to the groove 37, is provided to a distal-end side of the locking annular body 7. A sealing material or an adhesive may also be used alongside in order to prevent any cutting fluid from entering.

Figure 13:
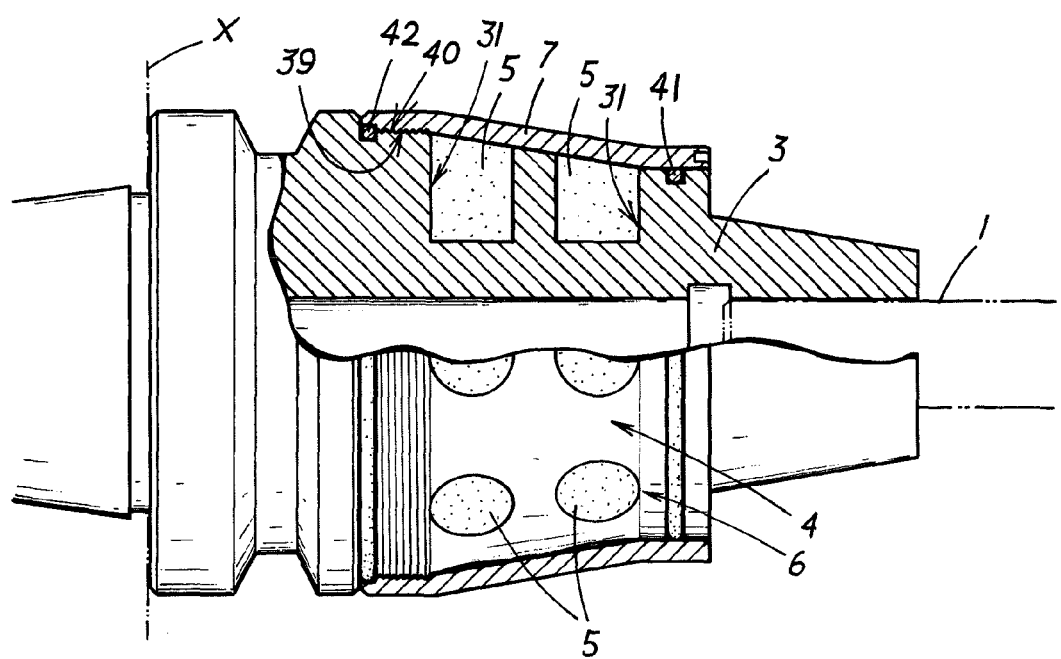
FIG. 13 is a partly cut-out schematic side view showing a configuration of alternative example 3-5 of the present embodiment.

In FIG. 13 (alternative example 3-5), a configuration is present in which a tool holder 3 for securing and holding the tool through shrink fitting is used; a threaded part 39 is provided to a proximal-end side of the locking annular body 7; a threadedly engaging part 40 for threadedly engaging with the threaded part 39 is provided to the outer peripheral section of the tool holder 3; and the locking annular body 7 is mounted on the tool holder 3. The distal-end side and the proximal-end side of the locking annular body 7 are respectively sealed by an O-ring 41, 42. A distal-end side installation groove, into which the distal-end side O-ring 41 is installed, is provided to the distal-end side of the large-diameter portion at the center of the tool holder 3. A proximal-end side installation groove, into which the proximal-end side O-ring 42 is installed, is provided to each of the proximal-end side of the large-diameter portion of the center at the tool holder 3 and the proximal-end side of the locking annular body 7. A tapered part, which tapers gradually downwards from the proximal-end side to the distal-end side, is provided to the large-diameter portion at the center of the tool holder 3. A tapered part is also provided to the center of the locking annular body 7 so as to fit the outer periphery of the large-diameter portion at the center of the tool holder 3.

Each of the structures for mounting the locking annular body 7 to the tool holder 3 according to the alternative examples 3 above is not limited to the alternative examples 3, and can also be applied to the above-mentioned embodiment.

Figure 14:
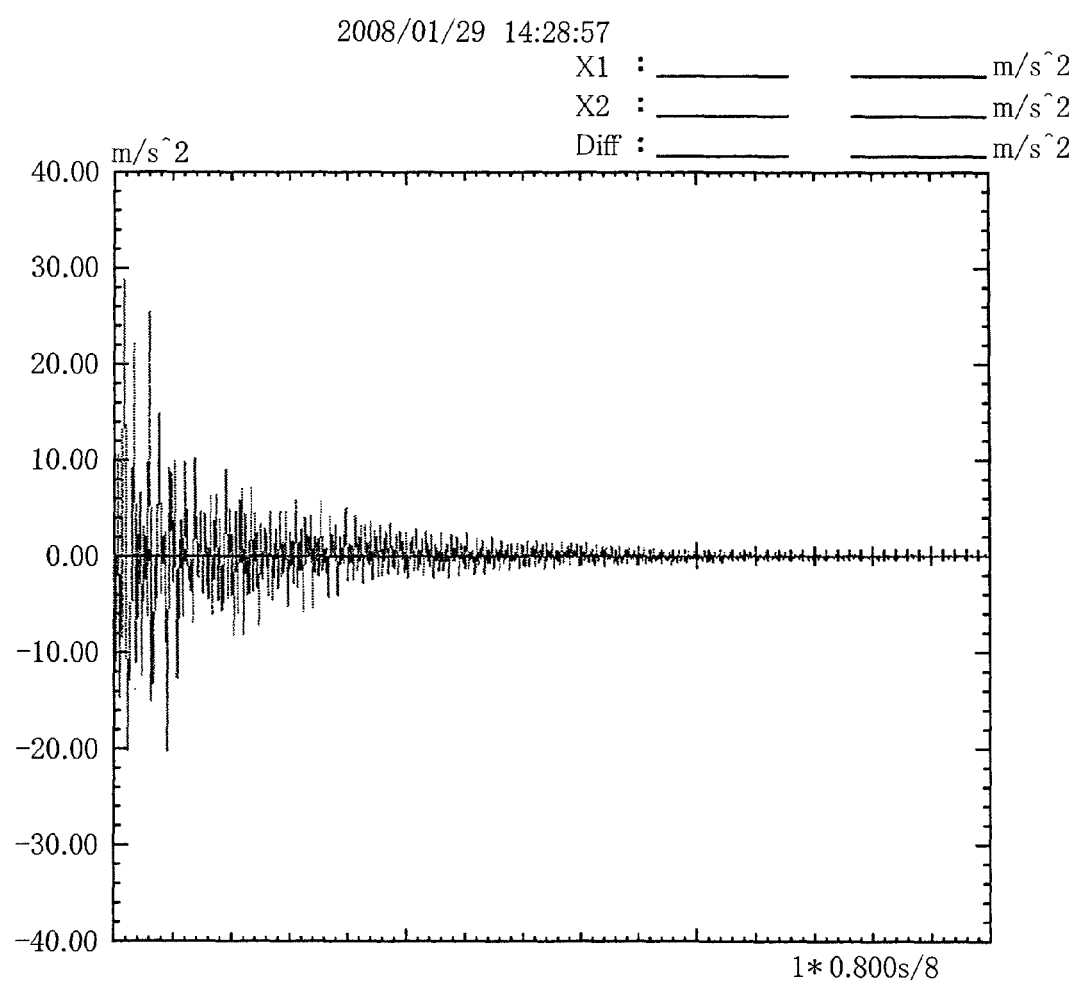
FIG. 14 is a graph showing experimental results according to a conventional example.
Figure 15:
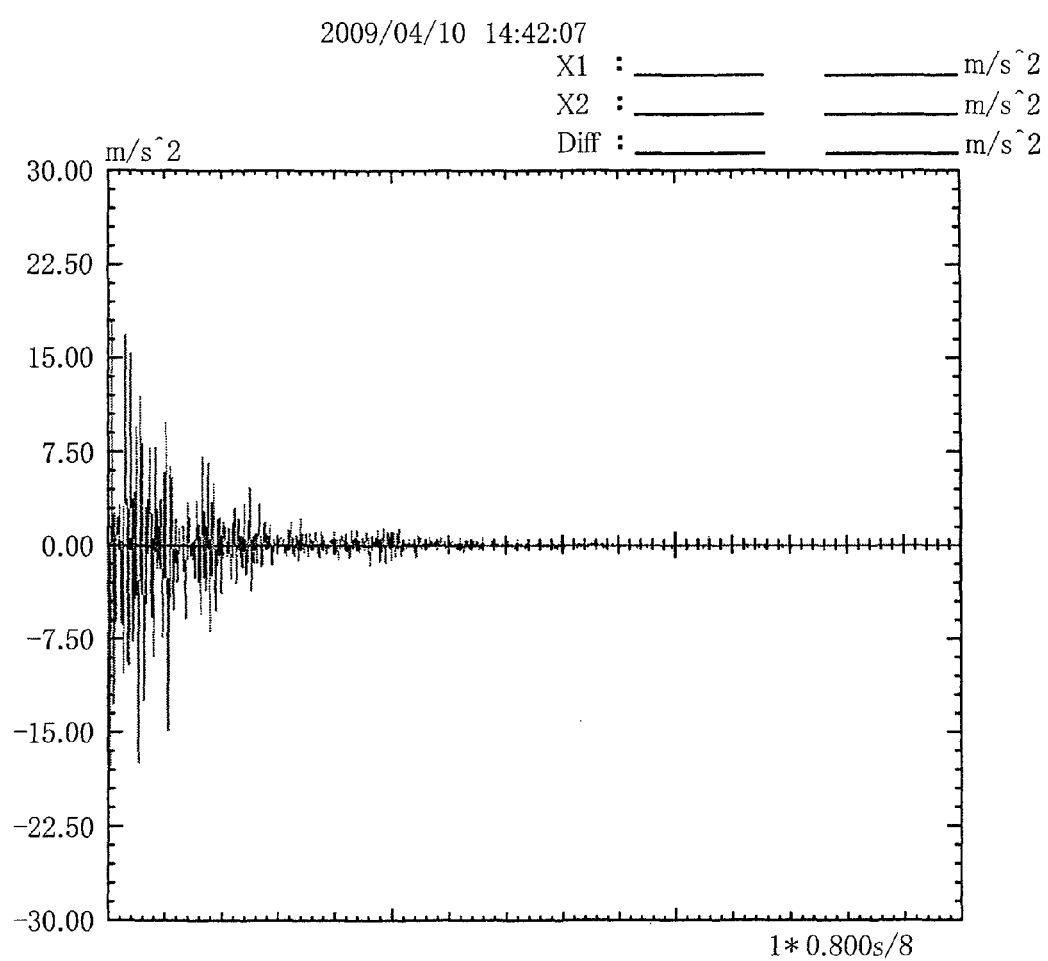
FIG. 15 is a graph showing experimental results according to the present embodiment.

FIG. 14 shows a result of measuring the vibration-damping performance according to a conventional example (having a similar structure to the present embodiment, other than not having a vibration-minimizing part). FIG. 15 shows a result of measuring the vibration-damping performance according to the present embodiment. It can be seen that exceptional vibration-damping performance can be obtained according to the present embodiment.

Since the present invention is configured as described above, when the shank part 2 of the tool holder 3 is fitted on a spindle of a machine tool, the tool 1 that is held is caused to rotate, and machining is performed, a vibration generated in the tool 1 is transmitted through the tool holder 3 to the vibration-minimizing part. Vibration energy is converted into heat energy by friction between the vibration-damping materials 5 and the reinforcing parts 4, in addition to friction between molecules in the vibration-damping materials 5, whereby the vibration energy is damped. Vibration of the tool 1 is thereby minimized.

Specifically, friction is mutually generated between the vibration-damping materials 5, which are provided in a state of being segmented in the peripheral direction, and a side surface of each of the reinforcing parts 4 between the vibration-damping materials 5 (i.e., a wall surface that is perpendicular to the direction of rotation of the tool 1), whereby conversion of vibration energy into heat energy is further promoted. Together with the increase in stiffness due to the reinforcing parts 4, it becomes possible to minimize the vibration of the tool 1 in an extremely efficient manner.

A tool holder that is capable of exerting a vibration-minimizing effect in a reliable manner using a simple configuration and that is extremely useful for practical application is thereby obtained according to the present embodiment.

The invention claimed is:

1. A tool holder comprising:
a vibration-minimizing part for minimizing vibration generated in a tool when the tool is used to perform machining, the vibration-minimizing part being provided, on a distal-end side, with tool-holding means for detachably securing the tool and provided, on a proximal-end side, with a shank part to be mounted on a spindle of a machine tool;
a plurality of reinforcing parts extending in an axial direction of the tool holder provided in a radial direction to a peripheral section of the tool holder;
accommodating recesses for accommodating a vibration-damping material provided between the reinforcing parts;
the vibration-damping material filling the accommodating recesses so that friction between the vibration-damping material and surfaces of the reinforcing parts converts vibration energy into heat energy; and
the vibration-damping material and the reinforcing parts constituting the vibration-minimizing part.

2. A tool holder comprising:
a vibration-minimizing part for minimizing vibration generated in a tool when the tool is used to perform machining, the vibration-minimizing part being provided, on a distal-end side, with tool-holding means for detachably securing the tool and provided, on a proximal-end side, with a shank part to be mounted on a spindle of a machine tool;
a plurality of reinforcing ribs extending in an axial direction of the tool holder provided in a radial direction to a peripheral section of the tool holder;
a space between each of the reinforcing ribs configured as an accommodating recess for accommodating a vibration-damping material;
the vibration-damping material filling the accommodating recesses so that friction between the vibration-damping material and surfaces of the reinforcing ribs converts vibration energy into heat energy; and
the vibration-damping material and the reinforcing ribs constituting the vibration-minimizing part.

3. A tool holder comprising:
a vibration-minimizing part for minimizing vibration generated in a tool when the tool is used to perform machining, the vibration-minimizing part being provided, on a distal-end side, with tool-holding means for detachably securing the tool and provided, on a proximal-end side, with a shank part to be mounted on a spindle of a machine tool;
a plurality of reinforcing walls extending in an axial direction of the tool holder provided in a radial direction to a peripheral section of the tool holder;
hole-shaped accommodating recesses for accommodating a vibration-damping material provided between the reinforcing walls;
the vibration-damping material filling the hole-shaped accommodating recesses so that friction between the vibration-damping material and surfaces of the reinforcing walls converts vibration energy into heat energy; and
the vibration-damping material and the reinforcing walls constituting the vibration-minimizing part.

4. The tool holder according to claim 1, characterized in that the accommodating recesses are provided to equidistant positions along a peripheral direction of the tool holder.

5. The tool holder according to claim 2, characterized in that the accommodating recesses are provided to equidistant positions along a peripheral direction of the tool holder.

6. The tool holder according to claim 3, characterized in that the accommodating recesses are provided to equidistant positions along a peripheral direction of the tool holder.

7. The tool holder according to claim 1, characterized in that the accommodating recesses are provided to positions that are symmetrical about an axial center of the tool holder.

8. The tool holder according to claim 2, characterized in that the accommodating recesses are provided to positions that are symmetrical about an axial center of the tool holder.

9. The tool holder according to claim 3, characterized in that the accommodating recesses are provided to positions that are symmetrical about an axial center of the tool holder.

10. The tool holder according to any of claims 1 through 3, characterized in that a locking annular body for preventing the vibration-damping material from dislodging is fitted on the tool holder.

11. The tool holder according to claim 10, characterized in that the locking annular body is provided in a state of being incapable of rotating relative to the tool holder.

12. The tool holder according to claim 10, characterized in that the locking annular body is provided in a state of being capable of oscillatory movement relative to the tool holder.

13. The tool holder according to any of claims 1 through 3, characterized in that an article made from a viscoelastic body is used as the vibration-damping material.

14. The tool holder according to any of claims 1 through 3, characterized in that an article made from a large quantity of particulate is used as the vibration-damping material.

15. The tool holder according to any of claims 1 through 3, characterized in that an article made from a viscoelastic body is used as the vibration-damping material, and a spherical body is embedded in the viscoelastic body.

\* \* \* \* \*